UNITED STATES PATENT OFFICE.

JULIUS FRAUENBERGER, OF NEW YORK, N. Y., ASSIGNOR TO C. L. JOSLIN, W. L. PALMER, AND A. W. WILLIAMS, COMPOSING THE FIRM OF JOSLIN, PALMER & WILLIAMS.

IMPROVEMENT IN COMPOSITIONS AND PROCESSES FOR MAKING ARTIFICIAL CORAL, IVORY, &c.

Specification forming part of Letters Patent No. 182,431, dated September 19, 1876; application filed December 23, 1875.

*To all whom it may concern:*

Be it known that I, JULIUS FRAUENBERGER, of the city, county, and State of New York, have invented a new and Improved Composition for Artificial Corals, Ivory, Amber, Horn, &c., which is fully described in the following specification:

My invention relates to an improved composition for manufacturing artificial corals, ivory, amber, horn, and similar articles, in a cheap, durable, and neat manner, for various applications in the arts; and it consists of caseine or curd mixed by proper exposure to heat, with sal-soda dissolved in water, and to this, after cooling, is added acetic acid, and the mass colored, as required, for the different applications.

To prepare my said composition, take, say, ten pounds of fresh caseine or curd, fifteen pounds of water, and one-half pound of sal-soda, (the ordinary washing-soda,) and mix all together, or previously dissolve the soda in the water; then boil the mixture in a closed or covered vessel on a water-bath for about an hour, or until the caseine has become thoroughly dissolved; then allow the mass to cool. In the process of cooling, certain impurities and oily matters will appear upon the surface, which should be carefully removed. When sufficiently cold, color as desired, and stir in vigorously four pounds of acetic acid. A thick, pasty, gummy mass is the result, which should be freed from moisture by pressure and evaporation.

The hardened pieces can be slightly dampened by wrapping them in moist cloths, or other suitable wrappings, previous to pressing them into molds, which should be warmed before use; or such pressing can be done, if desired, before the material has become thoroughly dry and hard.

The articles produced with this composition, under the required degree of pressure, have nearly the same finish, color, and appearance as similar articles made from corals, ivory, amber, horns, &c., and may, by reason of their comparatively small cost of manufacture, be advantageously used in lieu of such natural substances for a great variety of purposes, both ornamental and useful.

Having thus described my invention, I claim as new and desire to secure by Letters Patent—

1. The composition for producing artificial corals, ivory, amber, horn, &c., consisting of caseine, sal-soda, acetic acid, and coloring matter, substantially as herein described.

2. The process herein described of producing artificial corals, ivory, amber, horn, &c., by mixing caseine with sal-soda and water, and subjecting the mixture to heat, then removing the oily matter, and after cooling and coloring, adding thereto acetic acid, all substantially as set forth.

JULIUS FRAUENBERGER.

Witnesses:
A. STRAUS,
JAMES A. HUDSON.